(12) United States Patent
Iwaki

(10) Patent No.: US 9,933,893 B2
(45) Date of Patent: Apr. 3, 2018

(54) METHOD AND PROGRAM FOR DRIVING INFORMATION PROCESSING DEVICE

(71) Applicant: SEMICONDUCTOR ENERGY LABORATORY CO., LTD., Atsugi-shi, Kanagawa-ken (JP)

(72) Inventor: Yuji Iwaki, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 15/486,674

(22) Filed: Apr. 13, 2017

(65) Prior Publication Data

US 2017/0220188 A1  Aug. 3, 2017

Related U.S. Application Data

(63) Continuation of application No. 14/027,801, filed on Sep. 16, 2013, now Pat. No. 9,626,889.

(30) Foreign Application Priority Data

Sep. 24, 2012  (JP) ................................. 2012-210228

(51) Int. Cl.
  *G06F 3/041*  (2006.01)
  *G06F 3/048*  (2013.01)
  *G06F 3/0483*  (2013.01)

(52) U.S. Cl.
  CPC .......... *G06F 3/0416* (2013.01); *G06F 3/0483* (2013.01); *G06F 2203/04101* (2013.01)

(58) Field of Classification Search
  CPC ...... G06F 2203/04101; G06F 3/04883; G09G 3/20
  See application file for complete search history.

(56) References Cited

U.S. PATENT DOCUMENTS

| | | |
|---|---|---|
| 5,977,940 A | 11/1999 | Akiyama et al. |
| 7,286,108 B2 | 10/2007 | Tsuda et al. |
| 7,321,353 B2 | 1/2008 | Tsuda et al. |

(Continued)

FOREIGN PATENT DOCUMENTS

| | | |
|---|---|---|
| EP | 1798630 A | 6/2007 |
| EP | 2469393 A | 6/2012 |

(Continued)

*Primary Examiner* — Afroza Chowdhury
(74) *Attorney, Agent, or Firm* — Nixon Peabody LLP; Jeffrey L. Costellia

(57) ABSTRACT

A method for driving an information processing device which is adaptable to a wider variety of input methods is provided. The coordinates of an operating body at a starting point in the XYZ space and the coordinates of the operating body at an ending point in the XYZ space after a certain period of time are obtained, and the Z coordinate at the ending point and the movement distance on the X-Y plane in the certain period of time are calculated. Then, a signal is output only in the case where both the distance from an operating surface to the operating body in the vertical direction and the movement distance in the horizontal direction exceed the respective threshold values. In this manner, input operation can be performed by a three-dimensional motion, which includes movement of the operating body in the vertical direction as well as in the horizontal direction.

10 Claims, 9 Drawing Sheets

(56) References Cited

U.S. PATENT DOCUMENTS

| | | | |
|---|---|---|---|
| 7,477,216 | B2 | 1/2009 | Koyama et al. |
| 7,791,072 | B2 | 9/2010 | Kumomi et al. |
| 7,791,074 | B2 | 9/2010 | Iwasaki |
| 7,882,379 | B2 | 2/2011 | Kanakogi |
| 8,300,005 | B2 | 10/2012 | Tateuchi et al. |
| 8,866,853 | B2 | 10/2014 | Uyama et al. |
| 2005/0212737 | A1 | 9/2005 | Yoshihara et al. |
| 2007/0040792 | A1 | 2/2007 | Kwag et al. |
| 2007/0072439 | A1 | 3/2007 | Akimoto et al. |
| 2007/0108446 | A1 | 5/2007 | Akimoto |
| 2008/0055218 | A1 | 3/2008 | Tsuda et al. |
| 2008/0055225 | A1 | 3/2008 | Pak et al. |
| 2008/0158137 | A1 | 7/2008 | Yoshida |
| 2009/0051801 | A1 | 2/2009 | Mishina et al. |
| 2009/0261325 | A1 | 10/2009 | Kawamura et al. |
| 2009/0267064 | A1 | 10/2009 | Yano et al. |
| 2010/0095206 | A1 | 4/2010 | Kim |
| 2010/0156850 | A1 | 6/2010 | Kurokawa |
| 2012/0001874 | A1 | 1/2012 | Kurokawa et al. |
| 2012/0084646 | A1* | 4/2012 | Homma .............. G06F 3/04883 715/273 |
| 2012/0133585 | A1 | 5/2012 | Han et al. |
| 2012/0154305 | A1 | 6/2012 | Nunomaki |
| 2012/0188269 | A1* | 7/2012 | Uyama .................. G06F 3/041 345/619 |
| 2013/0069894 | A1 | 3/2013 | Chen et al. |
| 2013/0104017 | A1* | 4/2013 | Ko ........................ G06F 3/0483 715/205 |
| 2013/0194174 | A1 | 8/2013 | Bondan et al. |
| 2015/0116213 | A1* | 4/2015 | Bondan .................. G06F 3/005 345/156 |

FOREIGN PATENT DOCUMENTS

| | | |
|---|---|---|
| JP | 05-019949 A | 1/1993 |
| JP | 2001-022508 A | 1/2001 |
| JP | 2007-163891 A | 6/2007 |
| JP | 2010109467 A | 5/2010 |
| JP | 2010-191288 A | 9/2010 |
| JP | 2012-133525 A | 7/2012 |
| JP | 2012-150761 A | 8/2012 |

* cited by examiner

FIG. 3A
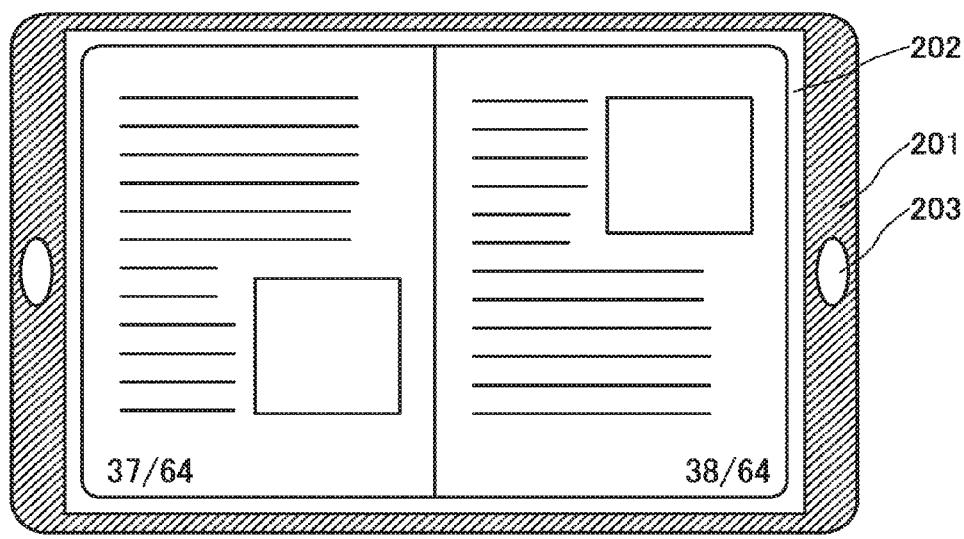
FIG. 3B1
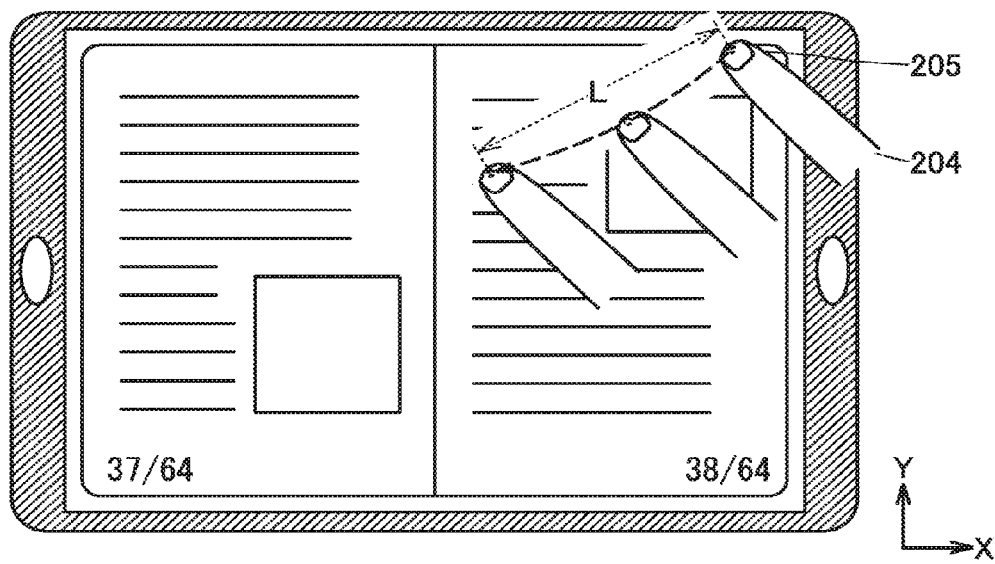
FIG. 3B2
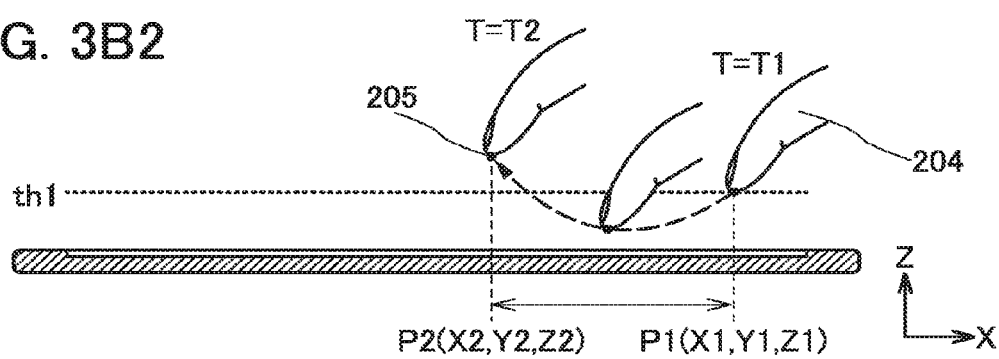

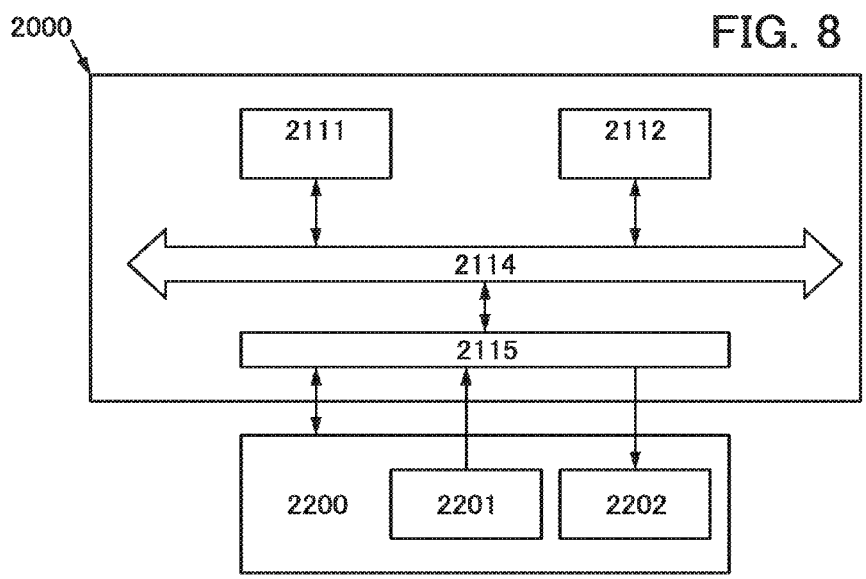

METHOD AND PROGRAM FOR DRIVING INFORMATION PROCESSING DEVICE

BACKGROUND OF THE INVENTION

1. Field of the Invention

The invention disclosed in this specification relates to a method and a program for driving an information processing device, particularly an information processing device including a touch panel.

2. Description of the Related Art

In recent years, information processing devices which include a display panel and a touch panel capable of detecting contact or proximity of an operating body are widely used.

A touch panel is a position input device which can detect a position pointed at with a finger, a stylus, or the like and can generate a signal including the positional information. An information processing device which is obtained in such a manner that a touch panel is overlapped with an image display region is also referred to as a touch screen. The information processing device can display an image in the image display region and can obtain as information which position in the image display region is pointed at by a user.

An information display device including a touch panel and a liquid crystal display panel is described in Patent Document 1.

The touch screen has both functions as a position input device and as a display device; therefore, the information processing device has high operability and is easily reduced in size as compared to the case where a position input device such as a touchpad or a mouse is used. Accordingly, by adding a touch panel to a thin display device such as a flat panel display, the size or thickness of an information processing device can be further reduced. Therefore, application of a display device provided with a touch panel to various information processing devices including portable devices as well as stationary devices can be expected.

REFERENCE

Patent Document

[Patent Document 1] Japanese Published Patent Application No. 2001-022508

SUMMARY OF THE INVENTION

Demands for a wider variety of input methods for information processing devices arise as information processing devices including a touch panel are downsized and the variety of functions thereof is increased.

Thus, an object of one embodiment of the present invention is to provide a method for driving an information processing device which is adaptable to a wider variety of input methods.

A touch panel of one embodiment of the present invention obtains the coordinates of an operating body (e.g., a finger) at a starting point in the XYZ space and the coordinates of the operating body at an ending point in the XYZ space after a certain period of time, and calculates the Z coordinate at the ending point and the movement distance on the X-Y plane in the certain period of time. Then, the touch panel outputs a signal only in the case where both the distance from an operating surface to the operating body in the vertical direction and the movement distance in the horizontal direction exceed the respective threshold values. In this manner, input operation can be performed by a three-dimensional motion (gesture), which includes movement of the operating body in the vertical direction as well as in the horizontal direction; thus, the variety of input operations can be increased. Moreover, input by a three-dimensional motion (gesture) enables intuitive operation by a user. Specific examples of driving are described below.

One embodiment of the present invention is a method for driving an information processing device including a display surface displaying an image and an operating surface touched or approached by an operating body. The method includes the steps of sensing that a distance from the operating surface to the operating body in a vertical direction is less than or equal to a threshold value, obtaining first coordinates of the operating body, obtaining second coordinates of the operating body after a certain period of time, and outputting an image switching signal when a coordinate in the vertical direction among the second coordinates exceeds the threshold value and a movement distance of the operating body in a horizontal direction calculated from the first coordinates and the second coordinates exceeds a threshold value.

Another embodiment of the present invention is a method for driving an information processing device including a display surface displaying an image and an operating surface touched or approached by an operating body. The method includes the steps of sensing that a distance from the operating surface to the operating body in a vertical direction is less than or equal to a threshold value, obtaining first coordinates of the operating body, obtaining second coordinates of the operating body after a certain period of time, calculating a movement distance of the operating body in a horizontal direction from the first coordinates and the second coordinates when a coordinate in the vertical direction among the second coordinates exceeds the threshold value, and outputting an image switching signal when the movement distance of the operating body in the horizontal direction exceeds a threshold value.

Another embodiment of the present invention is a method for driving an information processing device including a display portion and a touch panel capable of outputting the image switching signal. The display portion includes a pixel circuit which holds a first driving signal input and includes a display element changing, in accordance with the first driving signal, an image displayed on the display surface; a first driver circuit outputting the first driving signal to the pixel circuit; and a second driver circuit outputting a second driving signal selecting the pixel circuit to the pixel circuit. The second driver circuit has a first mode in which the second driving signal is output to the pixel circuit at a frequency of 30 times or more per second and a second mode in which the second driving signal is output to the pixel circuit at a frequency of less than 0.1 times per second. When the image switching signal is input to the second driver circuit in the second mode, the second driver circuit is switched to the first mode and outputs the second driving signal at least once.

In the method for driving an information processing device, the second driver circuit may be switched to the second mode again after outputting the second driving signal at least once.

In addition, one embodiment of the present invention includes a program capable of executing the above driving method. That is, one embodiment of the present invention is a program which makes an arithmetic unit execute a process including the steps of sensing that a distance from an operating surface touched or approached by an operating body to the operating body in a vertical direction is less than or equal to a threshold value, obtaining first coordinates of the operating body, obtaining second coordinates of the operating body after a certain period of time, and outputting an image switching signal when a coordinate in the vertical direction among the second coordinates exceeds the threshold value and a movement distance of the operating body in a horizontal direction calculated from the first coordinates and the second coordinates exceeds a threshold value.

According to one embodiment of the present invention, a new input method for an information processing device can be provided.

BRIEF DESCRIPTION OF THE DRAWINGS

FIGS. 3A, 3B-1, and 3B-2 illustrate an operating example of a portable information terminal.

FIG. 8 illustrates a structure of an arithmetic unit which executes a program of one embodiment.

DETAILED DESCRIPTION OF THE INVENTION

Hereinafter, embodiments of the present invention will be described in detail with reference to the accompanying drawings. Note that the present invention is not limited to the following description, and it will be easily understood by those skilled in the art that various changes and modifications can be made without departing from the spirit and scope of the present invention. Therefore, the present invention is not construed as being limited to description of the embodiments.

Note that a liquid crystal display panel, a light-emitting panel in which a light-emitting element typified by an organic light-emitting element (OLED) is provided for each pixel, electronic paper, a digital micromirror device (DMD), a plasma display panel (PDP), a field emission display (FED), or another display panel in which transistors are included in a pixel portion can be used for the display portion in the information processing device of the present invention.

Embodiment 1

In this embodiment, an example of a structure of an information processing device of one embodiment of the present invention and an example of a method for operating a touch panel included in the information processing device are described with reference to FIG. 1, FIG. 2, FIGS. 3A, 3B-1, and 3B-2, and FIGS. 4A and 4B.

<Example of Structure of Information Processing Device>

Figure 1:
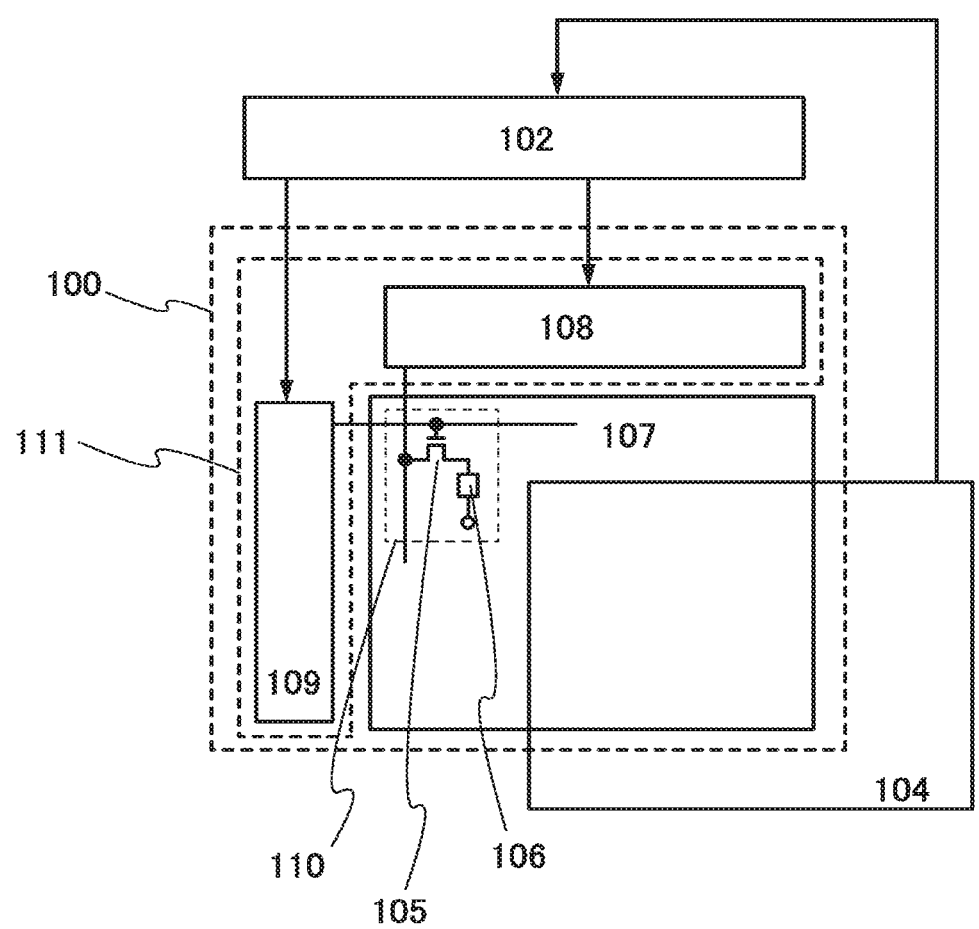
FIG. 1 is a block diagram illustrating a structure of an information processing device.

FIG. 1 is a block diagram illustrating a structure of an information processing device of one embodiment of the present invention as an example. Note that in a block diagram in this specification, circuits are classified in accordance with their functions and illustrated as independent blocks. However, it is difficult to classify actual circuits according to their functions completely and it is possible for one circuit to have a plurality of functions.

An information processing device illustrated in FIG. 1 includes a display portion 100, an arithmetic unit 102, and a touch panel 104.

The display portion 100 includes a pixel portion 107 provided with pixels 110 each including a transistor 105 and a display element 106, and a driver circuit 111 which controls operation of the pixel portion 107, such as a signal line driver circuit 108 and a scan line driver circuit 109. The scan line driver circuit 109 selects the pixel 110 included in the pixel portion 107 by controlling switching of the transistor 105. The signal line driver circuit 108 controls input of an image signal to the display element 106 of the selected pixel 110.

The touch panel 104 is placed so as to overlap with the pixel portion 107 of the display portion 100. When a user brings an operating body, such as a stylus or the user's finger, into contact with the touch panel 104 or close to the touch panel 104, the operating body is detected by a proximity sensor, and an operating signal including the positional information of the operating body is generated.

Further, the touch panel 104 includes a touch panel control circuit; with the control circuit, the touch panel 104 selects whether or not an image is rewritten in the pixel portion 107 by using the positional information included in the operating signal, and outputs the result of the selection to the arithmetic unit 102.

The arithmetic unit 102 controls supply of an image signal, a driving signal, and a power supply potential to the signal line driver circuit 108 and the scan line driver circuit 109 included in the display portion 100. Note that although the driving signal is a signal for controlling operation of the driver circuit 111 by a pulse, the kind of driving signal required for the operation varies depending on the structure of the driver circuit 111. Examples of driving signals include a start signal and a clock signal which control operation of a shift register and a latch signal which controls timing of data retention in a memory circuit. The signal line driver circuit 108 and the scan line driver circuit 109 can perform the above-described operation by the supply of the driving signal and the power supply potential.

Note that a correspondence between a position pointed at in the touch panel 104 and a position of the pixel portion 107 which overlaps with the position pointed at in the touch panel 104 is extracted or corrected in advance by a position correcting operation called calibration. The data of the correspondence may be held in a memory circuit included in the arithmetic unit 102 or a memory circuit included in the touch panel control circuit.

<Example of Operation of Touch Panel>

The procedure for detecting input to the touch panel included in the information processing device is described with reference to the flow chart in FIG. 2. Input operation is detected by the touch panel control circuit.

A status 0 (St300) is the initial state. First, the proximity sensor mounted on the touch panel detects an operating body (e.g., a finger) for a predetermined user operation (St302). When the distance from an operating surface to the operating body in the vertical direction becomes less than or equal to the threshold value (hereinafter, the threshold value of the distance in the vertical direction is also denoted by th1) (St304: Yes), occurrence of an event is recognized (St306).

When an event occurs, the coordinates P1 (X1, Y1, Z1) of the operating body at a starting point are obtained (St308). Then, the coordinates P2 (X2, Y2, Z2) of the operating body at an ending point are obtained (St310). The ending point is the position of the operating body after a certain period of time. Note that when the operating body is a finger, a predetermined point is recognized as a representative point and the coordinates thereof are obtained.

Here, in the case where the vertical coordinate Z2 among the obtained coordinates P2 is less than or equal to th1 (St312: No), the procedure returns to the status 0 without moving on to the next step. In the case where 72 is greater than th1 (St312: Yes), the movement distance of the operating body in the horizontal direction is calculated from the obtained P1 and P2 (St314). The movement distance of the operating body in the horizontal direction is calculated by the following formula: $\{(X1-X2)^2+(Y1-Y2)^2\}^{1/2}$.

In the case where the movement distance in the horizontal direction exceeds the threshold value (hereinafter, the threshold value of the movement distance in the horizontal direction is also denoted by th2) (St316: Yes), an image switching signal is output to the arithmetic unit illustrated in FIG. 1 (St318). In the case where the movement distance in the horizontal direction is less than or equal to th2, the procedure returns to the status 0 without an image switching signal being output to the arithmetic unit.

In this manner, the touch panel described in this embodiment detects proximity of the operating body based on a user operation, and selects whether or not a signal is output to the arithmetic unit in accordance with the movement distance of the operating body in the horizontal direction in a certain period of time and the vertical coordinate of the operating body after the certain period of time. That is, input operation can be performed by a three-dimensional motion (gesture), which includes movement in the vertical direction as well as movement in the horizontal direction, such as touch, slide, and drag operations, conventionally used for input operation. Thus, the variety of input operations can be increased. Moreover, input by a three-dimensional motion (gesture) enables intuitive operation by a user.

Figure 2:
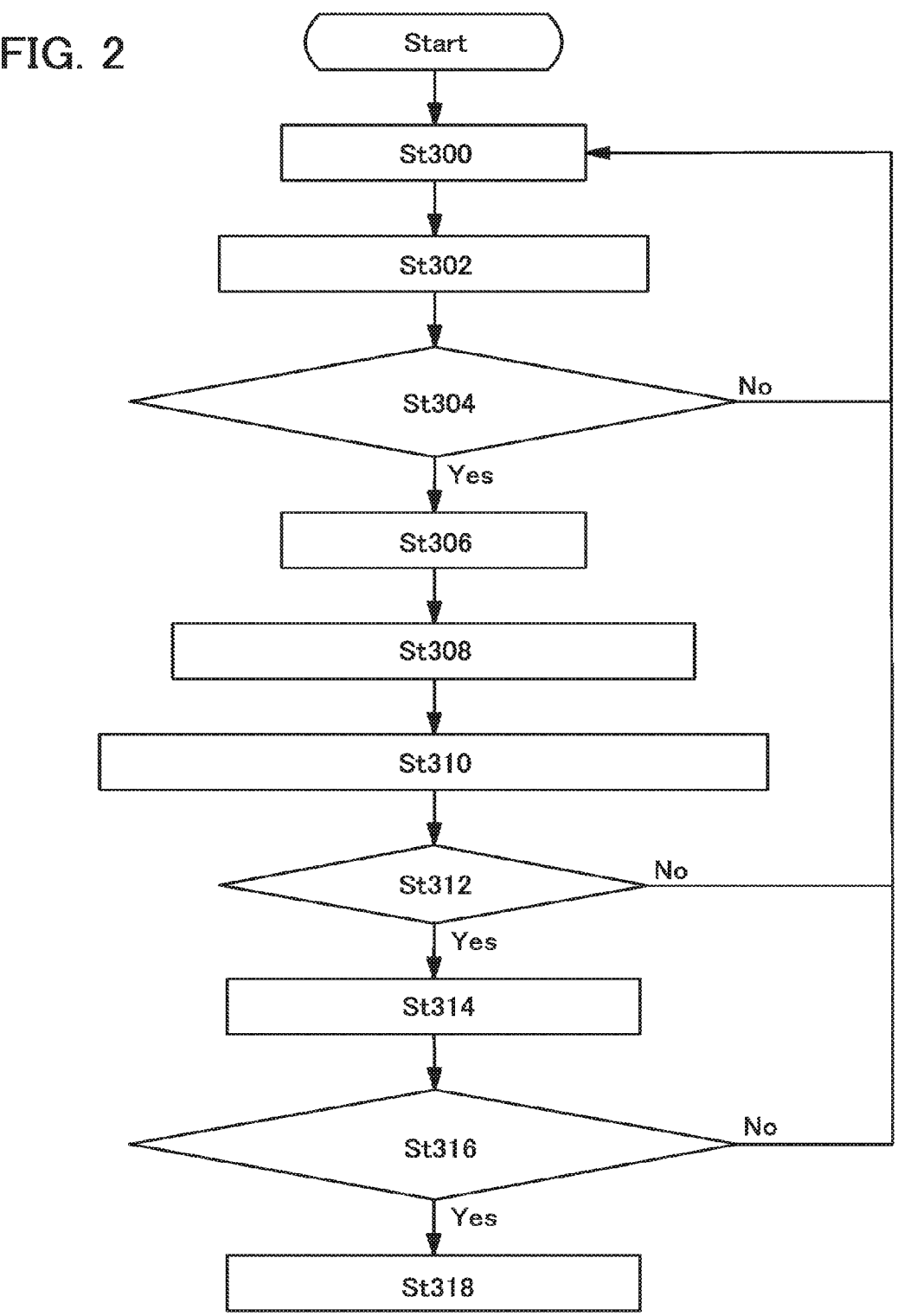
FIG. 2 is a flow chart showing an example of a method for operating a touch panel.

Note that FIG. 2 shows a flow chart in which the movement distance in the horizontal direction is calculated in the case where Z2 is greater than th1 after the coordinates P2 are obtained; however, this embodiment is not limited to this example. That is, the touch panel in this embodiment should output an image switching signal when the movement distance in the horizontal direction obtained from P1 and P2 is greater than th2 and the distance from the operating surface to the operating body in the vertical direction after a certain period of time is greater than th1. Accordingly, for example, it is possible to calculate the movement distance in the horizontal direction after obtaining P2 and calculate whether or not Z2 is greater than th1 in the case where the movement distance is greater than th2, or to concurrently calculate whether or not Z2 is greater than th1 and whether or not the movement distance is greater than th2.

<Specific Example of Operation of Information Processing Device>

Operation of a portable information terminal including a proximity-sensing touch panel is described below as a more specific example of operation of the information processing device of one embodiment of the present invention. Here, the case where a document is displayed on a display surface and operation of turning over a page of the document (referred to as page turning operation) is performed by a gesture with an operating body such as a finger is described.

Note that in the following description, the display surface on which an image is displayed overlaps with an operating surface touched or approached by the operating body. In addition, the operating surface refers to a surface which serves as a reference for the position (coordinates) of the operating body such as a finger.

Here, the display surface does not always need to overlap with the operating surface. For example, a display with a display surface and a proximity-sensing touch panel can be placed at given separate places and a gesture can be made toward an operating surface which is parallel to one surface of the proximity-sensing touch panel.

FIG. 3A illustrates a portable information terminal 200. In the portable information terminal 200, a housing 201 is provided with a display surface 202 including a proximity-sensing touch panel. The housing 201 is also provided with a switch 203 for operations such as startup, selection, and determination, and the like.

FIG. 3A illustrates a state where an image of a document is displayed on the display surface 202 of the portable information terminal 200.

FIGS. 3B-1 and 3B-2 illustrate a state where a gesture of turning over a page is performed by a finger 204. A broken line in FIG. 3B-1 illustrates the locus of a representative point 205 of the finger 204 projected on the X-Y plane, and a broken line in FIG. 3B-2 illustrates the locus of the representative point 205 projected on the X-Z plane.

At time T1, the representative point 205 approaches so that the Z coordinate thereof becomes less than or equal to the threshold value th1. Coordinates P1 (X1, Y1, Z1) are obtained at this time.

After that, the representative point 205 moves within a range where the Z coordinate thereof is less than or equal to th1, and then moves to a point where the Z coordinate exceeds the threshold value th1. Here, coordinates P2 of the representative point 205 at time T2 after a certain period of time from the time T1 are (X2, Y2, Z2).

When the Z coordinate Z2 of the representative point 205 at the time T2 is greater than the threshold value th1 and the movement distance L of the representative point 205 in the horizontal direction between the time T1 and the time T2 is greater than the threshold value th2, the motion is recognized as a gesture of turning over a page; thus, the page is turned over.

Figure 4A:
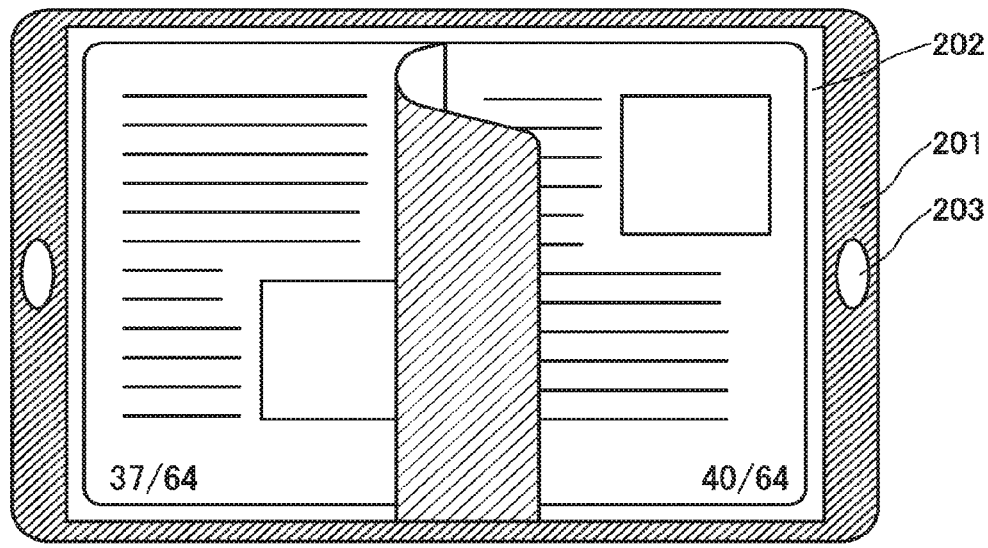
FIGS. 4A and 4B illustrate an operating example of a portable information terminal.

FIG. 4A illustrates a state where the page is being turned over. In accordance with the movement of the finger 204 from the right side to the left side of the display surface 202, display is performed so that the right page of the document displayed on the display surface 202 is turned over.

Figure 4B:
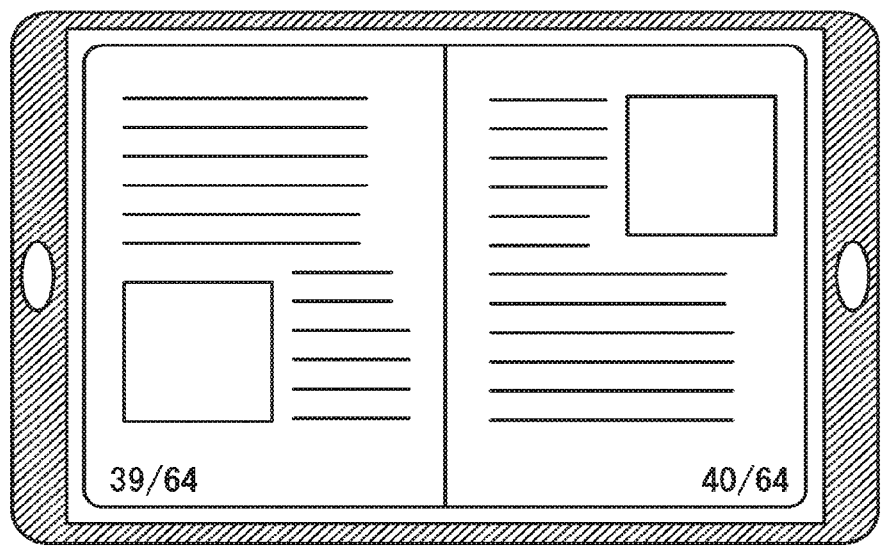

FIG. 4B illustrates a state where the page has been turned over. In FIG. 4B, pages of the document which follow those in FIG. 3A are displayed.

In the above manner, processing of an image such as a document displayed on the display surface can be performed intuitively by a user by a motion (gesture) with the operating body such as a finger.

Note that it is preferable to allow a user to individually set the threshold value th1, the threshold value th2, the length of the certain period of time for calculating the movement distance L, and the like.

Moreover, it is possible not to perform page turning operation when the movement distance in the X direction (lateral direction of the displayed image) between the time T1 and the time T2 does not exceed a certain value. For example, page turning operation is not performed when an angle which is formed by a straight line connecting P1 and P2 projected on the X-Y plane and the Y direction (longitudinal direction of the displayed image) is greater than or equal to 0° and less than 50; thus, more intuitive operation can be provided for a user.

This embodiment can be combined with any of the other embodiments disclosed in this specification as appropriate.

Embodiment 2

In this embodiment, a structure of an information processing device of one embodiment of the present invention will be described with reference to FIG. 5, FIGS. 6A and 6B, and FIG. 7.

Figure 5:
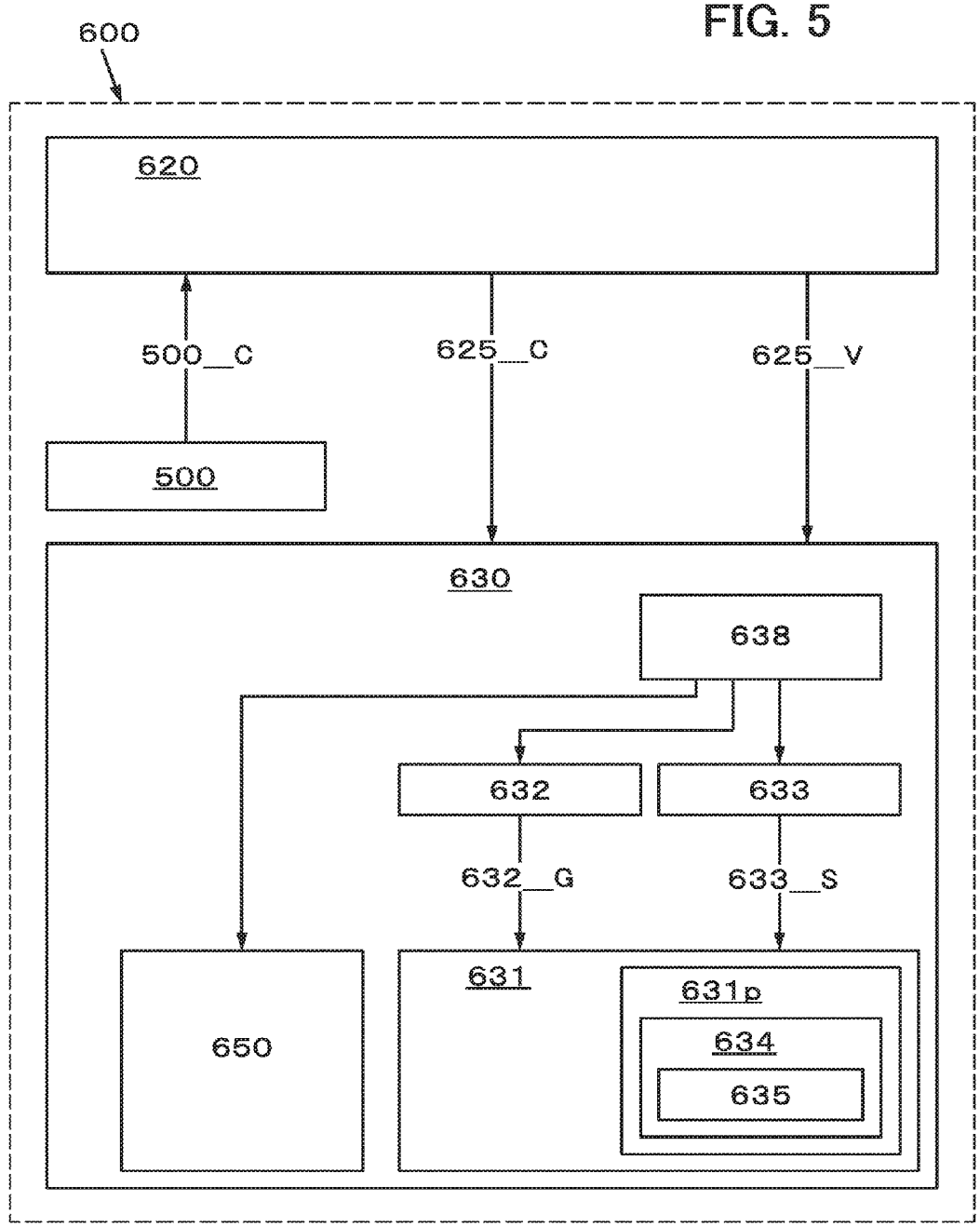
FIG. 5 is a block diagram illustrating a structure of an information processing device of one embodiment.

FIG. 5 is a block diagram illustrating the structure of the information processing device of one embodiment of the present invention.

Figure 6A:
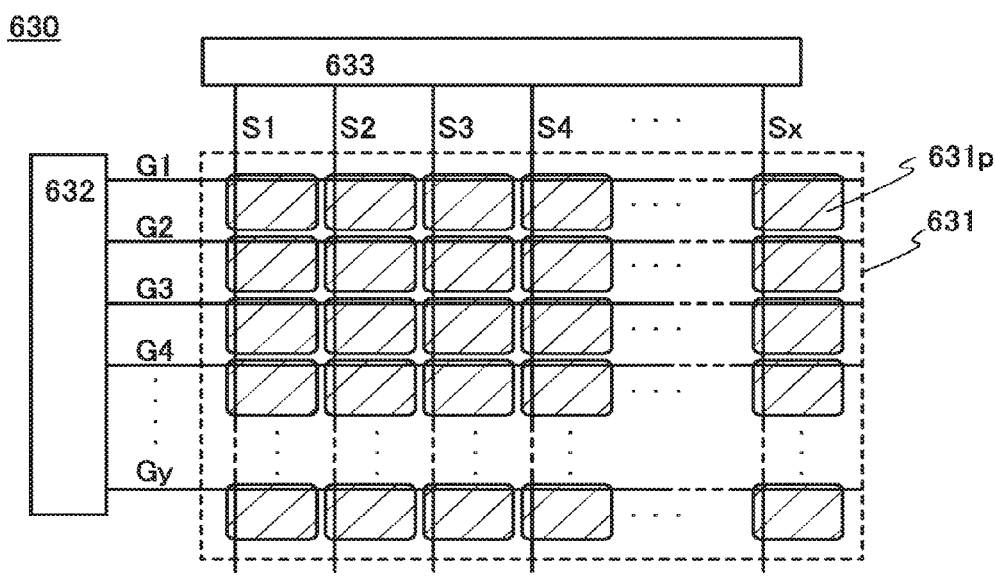
FIGS. 6A and 6B are a block diagram and a circuit diagram illustrating a structure of a display portion in an information processing device of one embodiment.
Figure 6B:
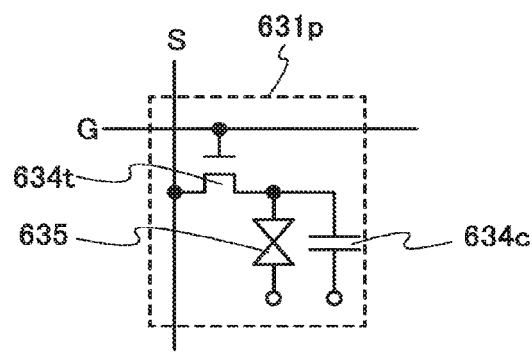

FIGS. 6A and 6B are a block diagram and a circuit diagram illustrating a structure of a display portion in the information processing device.

Figure 7:
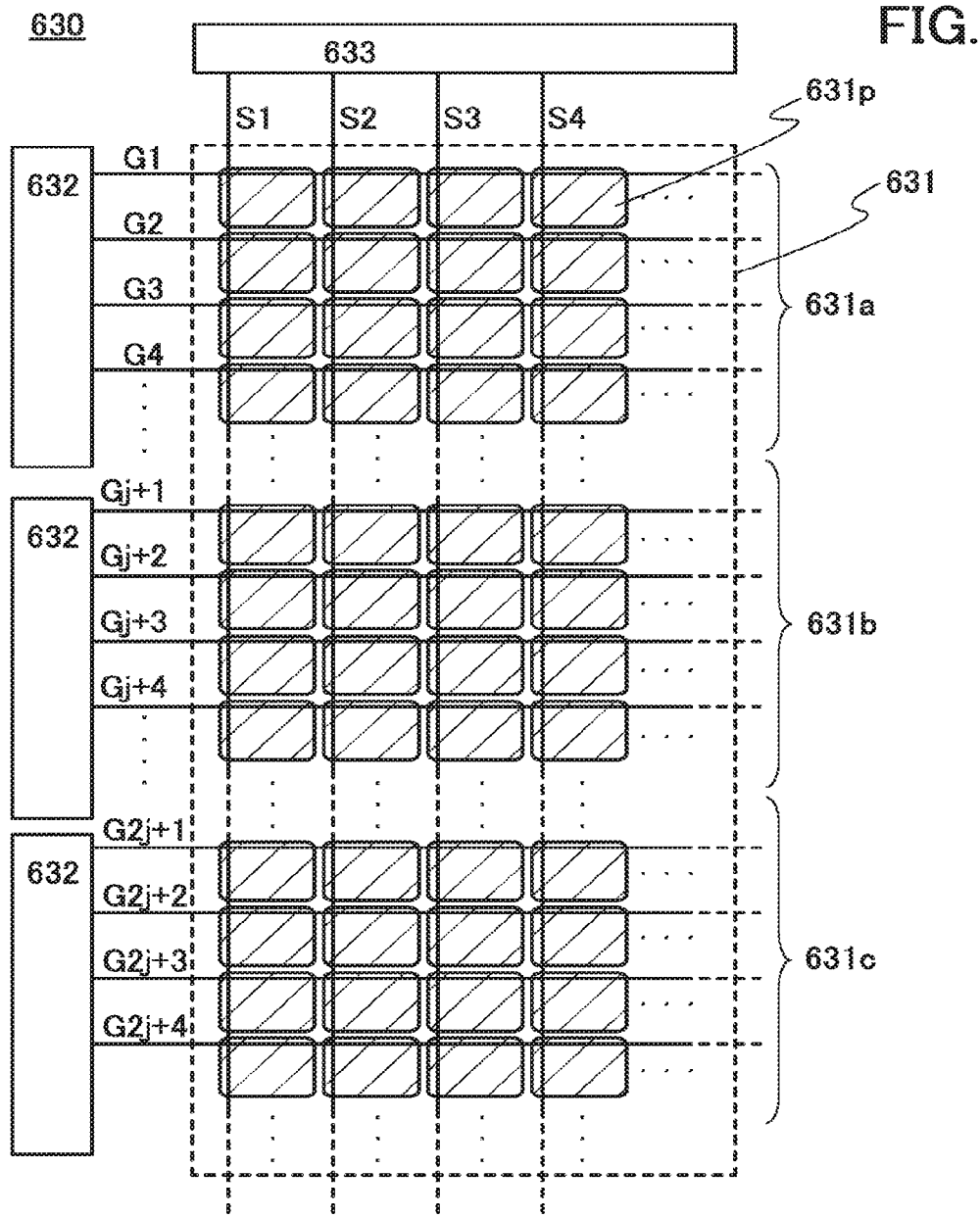
FIG. 7 is a block diagram illustrating a variation of a structure of a display portion in an information processing device of one embodiment

FIG. 7 is a block diagram illustrating a variation of the structure of the display portion in the information processing device.

An information processing device 600 described as an example in this embodiment includes a pixel portion 631 on which an image is displayed, pixel circuits 634 which hold first driving signals (also referred to as S signals) 633_S input and include display elements 635 displaying an image on the pixel portion 631 in accordance with the S signals 633_S, a first driver circuit (also referred to as S driver circuit) 633 which outputs the S signals 633_S to the pixel circuits 634, a second driver circuit (also referred to as G driver circuit) 632 which outputs second driving signals (also referred to as G signals) 632_G for selecting the pixel circuits 634 to the pixel circuits 634, and a touch panel 500 which senses proximity of an operating body and outputs image switching signals 500_C.

The G driver circuit 632 has a first mode in which the G signals 632_G are output to the pixel circuits at a frequency of 30 times or more per second and a second mode in which the G signals 632_G are output to the pixel circuits at a frequency of less than 0.1 times per second. When the image switching signals 500_C are input from the touch panel 500 to the G driver circuit 632 in the second mode, the G driver circuit 632 is switched to the first mode and outputs the G signals 632_G at least once, then being switched to the second mode.

The pixel circuit 634 is provided in a pixel 631p. A plurality of pixels 631p is provided in the pixel portion 631 in a display portion 630.

The information processing device 600 includes an arithmetic unit 620. The image switching signals 500_C are input to the arithmetic unit 620 from the touch panel 500. The arithmetic unit 620 outputs image signals 625_V and control signals 625_C including the image switching signals 500_C to the display portion 630.

The display portion 630 includes a D controller 638, which controls the S driver circuit 633 and the G driver circuit 632.

The display portion 630 includes a light supply portion 650, which supplies light to the pixel portion 631.

In the information processing device 600 in this embodiment having the above structure, not only the movement distance of the operating body in the horizontal direction but also the vertical coordinate of the operating body can be obtained and used for operating the information processing device. Consequently, a method for driving an information processing device which is adaptable to a wider variety of input methods can be provided.

Further, according to the method for driving the information processing device 600 in this embodiment, the frequency of rewriting display can be reduced in a period during which there is no input with the operating body. Consequently, an information processing device which is less likely to cause eyestrain on a user can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Further, in a p-channel transistor, a terminal to which a lower potential is applied is called a drain, and a terminal to which a higher potential is applied is called a source. In this specification, although connection relation of the transistor is described assuming that the source and the drain are fixed in some cases for convenience, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of the transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected to each other in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, a connection state means not only a state of direct connection but also a state of indirect connection through a circuit element such as a wiring, a resistor, a diode, or a transistor so that current, voltage, or a potential can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

The following describes individual components included in the information processing device of one embodiment of the present invention.

<2-1. Display Portion>

The display portion 630 includes the pixel portion 631 including a display element 635 in each pixel and driver circuits such as the S driver circuit 633 and the G driver circuit 632. The pixel portion 631 includes a plurality of pixels 631p each provided with the display element 635.

In this embodiment, the case where a liquid crystal element is used as the display element 635 is described.

The image signals 625_V that are input to the display portion 630 are supplied to the S driver circuit 633. In addition, power supply potentials and the control signals 625_C are supplied to the S driver circuit 633 and the G driver circuit 632.

Note that the control signals 625_C include, in addition to the image switching signals 500_C output by the touch panel 500, an S driver circuit start pulse signal SP and an S driver circuit clock signal CK that control the operation of the S driver circuit 633; a latch signal LP; a G driver circuit start pulse SP and a G driver circuit clock signal CK that control the operation of the G driver circuit 632; a pulse width control signal PWC; and the like.

FIG. 6A illustrates an example of a structure of the display portion 630.

In the display portion 630 in FIG. 6A, the plurality of pixels 631p, a plurality of scan lines G for selecting the pixels 631p row by row, and a plurality of signal lines S for supplying the S signals 633_S generated from the image signals 625_V to the selected pixels 631p are provided in the pixel portion 631.

The input of the G signals 632_G to the scan lines G is controlled by the G driver circuit 632. The input of the S signals 633_S to the signal lines S is controlled by the S driver circuit 633. Each of the plurality of pixels 631p is connected to at least one of the scan lines G and at least one of the signal lines S.

Note that the kinds and number of the wirings in the pixel portion 631 can be determined by the structure, number, and position of the pixels 631p. Specifically, in the pixel portion 631 illustrated in FIG. 6A, the pixels 631p are arranged in a matrix of x columns and y rows, and the signal lines S1 to Sx and the scan lines G1 to Gy are provided in the pixel portion 631.

<2-1-1. Pixel>

FIG. 6B illustrates an example of a structure of the pixel 631p. The pixel 631p includes a display element 635, a transistor 634t for controlling supply of the S signal 633_S to the display element 635, and a capacitor 634c for holding a voltage between a first electrode and a second electrode of the display element 635.

<2-1-1a. Display Element (Liquid Crystal Element)>

The display element 635 includes the first electrode, the second electrode, and a liquid crystal layer including a liquid crystal material to which the voltage between the first electrode and the second electrode is applied. In the display element 635, the alignment of liquid crystal molecules is changed in accordance with the level of voltage applied between the first electrode and the second electrode, so that the transmittance is changed. Accordingly, the transmittance of the display element 635 is controlled by the potential of the S signal 633_S; thus, gradation can be expressed.

<2-1-b. Transistor>

The transistor 634t controls whether to apply the potential of the signal line S to the first electrode of the display element 635. A predetermined reference potential Vcom is applied to the second electrode of the display element 635.

Note that a structure of a transistor suitable for an information processing device to which the driving method of one embodiment of the present invention can be applied is described in detail in Embodiment 3.

<2-1-2. Pixel Circuit>

An example of connection relation between the transistor 634t and the display element 635 is described with reference to FIG. 6B.

A gate of the transistor 634t is connected to any one of the scan lines G1 to Gy. One of a source and a drain of the transistor 634t is connected to any one of the signal lines S1 to Sx. The other of the source and the drain of the transistor 634t is connected to the first electrode of the display element 635.

Note that the pixel 631p may further include another circuit element such as a transistor, a diode, a resistor, a capacitor, or an inductor as needed.

In the pixel 631p exemplified in FIG. 6B, one transistor 634t is used as a switching element controlling input of the S signal 633_S to the pixel 631p; however, a plurality of transistors functioning as one switching element may be used in the pixel 631p. In the case where a plurality of transistors functions as one switching element, the plurality of transistors may be connected to each other in parallel, in series, or in combination of parallel connection and series connection.

<2-2. D Controller>

The D controller 638 transmits the image signals 625_V generated in the arithmetic unit 620 to the display portion 630.

The D controller 638 also has functions of generating control signals such as a start pulse signal SP, a latch signal LP, and a pulse width control signal PWC by using a synchronizing signal such as a vertical synchronizing signal or a horizontal synchronizing signal and supplying the control signals to the display portion 630 together with the image switching signals 500_C. A control signal such as a clock signal CK is also supplied to the display portion 630.

Further, the D controller 638 may be provided with an inversion control circuit to have a function of inverting the polarity of the image signal 625_V at a timing notified by the inversion control circuit. Specifically, the polarity of the image signal 625_V may be inverted in the D controller 638, or may be inverted in the display portion 630 in accordance with an instruction from the D controller 638.

The inversion control circuit has a function of determining timing of inverting the polarity of the image signal 625_V by using a synchronizing signal. For example, the inversion control circuit includes a counter and a signal generation circuit.

The counter has a function of counting the number of frame periods by using the pulse of a horizontal synchronizing signal.

The signal generation circuit has a function of notifying timing of inverting the polarity of the image signal 625_V to the D controller 638 so that the polarity of the image signal 625_V is inverted every plural consecutive frame periods by using information on the number of frame periods that is obtained in the counter.

<2-3. Arithmetic Unit>

The arithmetic unit 620 generates the image signals 625V to be input to the display portion 630. Note that the image signals 625_V may be directly input to the D controller 638.

<2-4. Light Supply Portion>

A plurality of light sources is provided in the light supply portion 650. The D controller 638 controls driving of the light sources in the light supply portion 650 through a light supply portion control circuit.

The light source in the light supply portion 650 can be a cold cathode fluorescent lamp, a light-emitting diode (LED), an OLED element generating luminescence (electroluminescence) when an electric field is applied thereto, or the like.

In particular, the intensity of blue light emitted by the light source is preferably weakened compared to that of light of any other color. Blue light included in light emitted by the light source reaches the retina in the eye without being absorbed by the cornea or the lens. Accordingly, weakening the intensity of blue light emitted by the light source compared to that of light of any other color makes it possible to reduce long-term effects of blue light on the retina (e.g., age-related macular degeneration), adverse effects of exposure to blue light until midnight on the circadian rhythm, and the like. In addition, a light source emitting light that mainly includes light with a wavelength longer than 400 nm and does not include light with a wavelength shorter than or equal to 400 nm (also referred to as UVA) is preferred.

<2-5. Method for Driving Pixel Portion>

An example of operation of the pixel portion 631 in FIG. 6A including the pixel 631p exemplified in FIG. 6B is described.

In a first frame period, the scan line G1 is selected by input of the G signal 632_G with a pulse to the scan line G1. In each of the plurality of pixels 631p connected to the selected scan line G1, the transistor 634t is turned on.

When the transistors 634t are on (in one line period), the potentials of the S signals 633S generated from the image signals 625_V are applied to the signal lines S1 to Sx. Through each of the transistors 634t that are on, charge corresponding to the potential of the S signal 633_S is accumulated in the capacitor 634c and the potential of the S signal 633_S is applied to a first electrode of the display element 635 including a liquid crystal element.

In a period during which the scan line G1 is selected in the first frame period, the S signals 633_S having a positive polarity are sequentially input to all the signal lines S1 to Sx. Thus, the S signals 633_S having a positive polarity are input to first electrodes G1S1 to G1Sx in the pixels 631p that are connected to the scan line G1 and the signal lines S1 to Sx.

The transmittance of the liquid crystal element of the display element 635 is controlled by the potential of the S signal 633_S; thus, gradation is expressed by the pixels.

Similarly, the scan lines G2 to Gy are sequentially selected, and the pixels 631p connected to the scan lines G2 to Gy are sequentially subjected to the same operation as that performed while the scan line G1 is selected. Through the above operations, an image for the first frame can be displayed on the pixel portion 631.

Note that in one embodiment of the present invention, the scan lines G1 to Gy are not necessarily selected sequentially.

It is possible to employ dot sequential driving in which the S signals 633_S are sequentially input to the signal lines S1 to Sx from the S driver circuit 633 or line sequential driving in which the S signals 633_S are input all at once. Alternatively, a driving method in which the S signals 633_S are sequentially input to every plural signal lines S may be employed.

In addition, the method for selecting the scan lines G is not limited to progressive scan; interlaced scan may be employed for selecting the scan lines G.

In given one frame period, the polarities of the S signals 633_S input to all the signal lines may be the same, or the polarities of the S signals 633_S to be input to the pixels may be inverted signal line by signal line.

FIG. 7 illustrates a variation of the structure of the display portion 630.

In the display portion 630 in FIG. 7, the plurality of pixels 631p, the plurality of scan lines G for selecting the pixels 631p row by row, and the plurality of signal lines S for supplying the S signals 633_S to the selected pixels 631p are provided in the pixel portion 631 divided into plural regions (specifically, a first region 631a, a second region 631b, and a third region 631c).

The input of the G signals 632_G to the scan lines G in each region is controlled by the corresponding G driver circuit 632. The input of the S signals 633_S to the signal lines S is controlled by the S driver circuit 633. Each of the plurality of pixels 631p is connected to at least one of the scan lines G and at least one of the signal lines S.

Such a structure allows the pixel portion 631 to be divided into separately driven regions.

For example, the following operation is possible: the image switching signals 500_C and coordinates specifying a region to which the image switching signals are to be input are obtained from the touch panel 500, and the specific region corresponding to the coordinates is driven in a first mode described later and the other region is driven in a second mode described later. Thus, it is possible to stop the operation of the G driver circuit for a region where the touch panel is not operated, that is, a region which does not require operation, thus reducing power consumption.

<2-6. First Mode and Second Mode of G Driver Circuit 632>

The S signal 633_S is input to the pixel circuit 634 to which the G signal 632_G is input, and the pixel circuit 634 holds the potential of the S signal 633_S. In other words, the pixel circuit 634 holds a state where the potential of the S signal 633_S is written in.

The pixel circuit 634 into which display data is written maintains a display state corresponding to the S signal 633_S. Note that to maintain a display state is to keep the amount of change in display state within a given range. This given range is set as appropriate, and is preferably set so that a user viewing displayed images can recognize the displayed images as the same image.

The G driver circuit 632 has the first mode and the second mode.

<2-6-1. First Mode>

The G driver circuit 632 in the first mode outputs the G signals 632_G to pixels at a frequency of 30 times or more per second, preferably more than or equal to 60 times and less than 960 times per second.

In the first mode, the S signals 633_S can be supplied to the pixels 631p at a high frequency. As a result, smooth moving images can be displayed, for example.

<2-6-2. Second Mode>

The G driver circuit 632 in the second mode outputs the G signals 632_G to pixels at a frequency of more than or equal to once per day and less than 0.1 times per second, preferably more than or equal to once per hour and less than once per second.

The pixel circuit 634 to which the G signal 632_G is not input keeps holding the S signal 633_S and maintains the display state corresponding to the potential of the S signal 633_S.

In the second mode, display by the pixel is not frequently rewritten; thus, an image without flicker can be displayed. As a result, eyestrain on a user of the information processing device can be reduced. Further, the operating frequency of the G driver circuit 632 can be reduced; thus, power consumed by the operation of the G driver circuit 632 can be reduced.

Note that the pixel circuit that is driven by the G driver circuit 632 having the second mode is preferably configured to hold the S signal 633_S for a long period. For example, the off-state leakage current of the transistor 634t is preferably as low as possible.

An example of a structure of the transistor 634t with low off-state leakage current is described in detail in Embodiment 3.

<2-6-3. Switching Between Two Modes>

When the image switching signals 500_C are input from the touch panel 500 to the G driver circuit 632 in the second mode through the D controller 638, the G driver circuit 632 is switched from the second mode to the first mode and outputs the G signals 632_G at least once, then being switched to the second mode.

For example, when the touch panel 500 senses a page turning operation, the touch panel 500 outputs the image switching signals 500_C to the arithmetic unit 620.

The arithmetic unit 620 generates the image signals 625_V including the page turning operation and outputs the image signals 625V together with the control signals 625_C including the image switching signals 500C.

The D controller 638 outputs the image switching signals 500_C to the G driver circuit 632 and outputs the image signals 625_V including the page turning operation to the S driver circuit 633.

The G driver circuit 632 is switched from the second mode to the first mode, and outputs the G signals 632_G frequently.

Meanwhile, the S driver circuit 633 outputs to the pixel circuits 634 the S signals 633_S generated from the image signals 625_V including the page turning operation.

Since the G signals 632_G are frequently input to the pixels 631p, a large number of image signals 625_V including the page turning operation are input. Specifically, a large number of frames can be displayed in a short time; thus, smooth images corresponding to the image signals 625_V including the page turning operation can be displayed.

<2-7. Overdriving>

Note that the response time of liquid crystal from application of voltage to saturation of the change in transmittance is generally about ten milliseconds. Thus, the slow response of the liquid crystal tends to be perceived as a blur of a moving image. As a countermeasure, in one embodiment of the present invention, overdriving may be employed in which the voltage applied to the liquid crystal element of the display element 635 is temporarily increased so that the alignment of liquid crystal changes quickly. By overdriving, the response speed of the liquid crystal can be increased, a blur of a moving image can be prevented, and the quality of the moving image can be improved.

Further, if the transmittance of the liquid crystal element of the display element 635 keeps changing without reaching a constant value after the transistor 634t is turned off, the relative permittivity of the liquid crystal also changes; accordingly, the voltage held in the liquid crystal element of the display element 635 easily changes.

For example, in the case where the capacitor 634c connected in parallel to the liquid crystal element of the display element 635 has small capacitance, the change in the voltage held in the liquid crystal element of the display element 635 tends to occur markedly. However, by the overdriving, the response time can be shortened and therefore the change in the transmittance of the liquid crystal element of the display element 635 after the transistor 634t is turned off can be made small. Accordingly, even in the case where the capacitor 634c connected in parallel to the liquid crystal element of the display element 635 has small capacitance, the change in the voltage held in the liquid crystal element of the display element 635 after turning off the transistor 634t can be prevented.

This embodiment can be combined with any of the other embodiments disclosed in this specification as appropriate.

Embodiment 3

An example of a semiconductor which is preferably used for the region where a channel is formed in the transistor which is shown as an example in the above embodiment is described below.

An oxide semiconductor has a wide energy gap of 3.0 eV or more. A transistor including an oxide semiconductor film obtained by a sufficient reduction in carrier density of the oxide semiconductor can have much lower leakage current between a source and a drain in an off state (off-state current) than a conventional transistor including silicon.

In the case where an oxide semiconductor film is used for a transistor, the thickness of the oxide semiconductor film is preferably greater than or equal to 2 nm and less than or equal to 40 nm.

An oxide semiconductor applicable to a transistor preferably contains at least indium (In) or zinc (Zn). In particular, In and Zn are preferably contained. In addition, as a stabilizer for reducing variation in electrical characteristics of a transistor using the oxide semiconductor, one or more elements selected from gallium (Ga), tin (Sn), hafnium (Hf), zirconium (Zr), titanium (Ti), scandium (Sc), yttrium (Y), and a lanthanoid (such as cerium (Ce), neodymium (Nd), or gadolinium (Gd)) is preferably contained.

As the oxide semiconductor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an Tn-Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, an "In—Ga—Zn-based oxide" means an oxide containing In, Ga, and Zn as its main components and there is no particular limitation on the ratio of In, Ga, and Zn. Further, the In—Ga—Zn-based oxide may contain a metal element other than In, Ga, and Zn.

Alternatively, a material represented by $InMO_3(ZnO)_m$ (m>0 is satisfied, and m is not an integer) may be used as the oxide semiconductor. Note that M represents one or more metal elements selected from Ga, Fe, Mn, and Co, or the above-described element as a stabilizer. Alternatively, as the oxide semiconductor, a material represented by $In_zSnO_5(ZnO)$, (n>0 is satisfied, and n is an integer) may be used.

For example, an In—Ga—Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

When the oxide semiconductor film contains a large amount of hydrogen, the hydrogen and the oxide semiconductor are bonded to each other, so that part of the hydrogen causes generation of electrons serving as carriers. As a result, the threshold voltage of the transistor shifts in the negative direction. Therefore, it is preferable that, after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Accordingly, it is preferable that oxygen be added to the oxide semiconductor film to compensate for a reduction in oxygen due to the dehydration treatment (dehydrogenation treatment). In this specification and the like, supplying oxygen to an oxide semiconductor film may be expressed as oxygen adding treatment, or treatment for making the oxygen content of an oxide semiconductor film be in excess of that of the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density of lower than or equal to $1\times10^{17}/cm^3$, lower than or equal to $1\times10^{16}/cm^3$, lower than or equal to $1\times10^{15}/cm^3$, lower than or equal to $1\times10^{14}/cm^3$, or lower than or equal to $1\times10^{13}/cm^3$.

Thus, the transistor including an i-type or substantially i-type oxide semiconductor film can have extremely favorable off-state current characteristics. For example, the drain current at the time when the transistor including an oxide semiconductor film is in an off-state can be less than or equal to $1\times10^{-18}$ A, preferably less than or equal to $1\times10^{-21}$ A, further preferably less than or equal to $1\times10^{-24}$ A at room temperature (about 25° C.); or less than or equal to $1\times10^{-15}$ A, preferably less than or equal to $1\times10^{-18}$ A, further preferably less than or equal to $1\times10^{-21}$ A at 85° C. An off state of a transistor refers to a state where gate voltage is sufficiently lower than the threshold voltage in an n-channel transistor. Specifically, the transistor is in an off state when the gate voltage is lower than the threshold voltage by 1V or more, 2V or more, or 3V or more.

A structure of an oxide semiconductor film is described below.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits a cube whose one side is less than 10 nm, less than 5 nm, or less than 3 nm.

The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 310. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when 2θ is around 56°. This peak is derived from the (110) plane of the TnGaZnO$_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of InGaZnO, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned with a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depends on regions.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In a transistor including the CAAC-OS film, change in electrical characteristics due to irradiation with visible light or ultraviolet light is small. Thus, the transistor has high reliability.

Note that an oxide semiconductor film may be a stacked film including two or more kinds of an amorphous oxide semiconductor film, a microcrystalline oxide semiconductor film, and a CAAC-OS film, for example.

For example, a CAAC-OS film can be deposited by a sputtering method using a polycrystalline oxide semiconductor sputtering target. When ions collide with the sputtering target, a crystal region included in the sputtering target may be separated from the target along an a-b plane; in other words, a sputtered particle having a plane parallel to an a-b plane (flat-plate-like sputtered particle or pellet-like sputtered particle) may flake off from the sputtering target. In that case, the flat-plate-like sputtered particle or the pellet-like sputtered particle reaches a surface where the CAAC-OS film is to be deposited while maintaining its crystal state, whereby the CAAC-OS film can be deposited.

The flat-plate-like sputtered particle has, for example, an equivalent circle diameter of a plane parallel to the a-b plane of greater than or equal to 3 nm and less than or equal to 10 nm, and a thickness (length in the direction perpendicular to the a-b plane) of greater than or equal to 0.7 nm and less than 1 nm. Note that in the flat-plate-like sputtered particle, the plane parallel to the a-b plane may be a regular triangle or a regular hexagon. Here, the term "equivalent circle diameter of a plane" refers to the diameter of a perfect circle having the same area as the plane.

For the deposition of the CAAC-OS film, the following conditions are preferably used.

When the substrate temperature during the deposition is increased, migration of the flat-plate-like sputtered particles which have reached the substrate occurs, so that a flat plane of each sputtered particle is attached to the substrate. At this time, the sputtered particles are positively charged, thereby being attached to the substrate while repelling each other; thus, the sputtered particles are not stacked unevenly, so that a CAAC-OS film with a uniform thickness can be deposited. Specifically, the substrate temperature during the deposition is preferably higher than or equal to 100° C. and lower than or equal to 740° C., more preferably higher than or equal to 200° C. and lower than or equal to 500° C.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a deposition chamber may be reduced. Furthermore, the concentration of impurities in a deposition gas may be reduced. Specifically, a deposition gas whose dew point is −80° C. or lower, preferably −100° C. or lower is used.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

After the CAAC-OS film is deposited, heat treatment may be performed. The temperature of the heat treatment is higher than or equal to 100° C. and lower than or equal to 740° C., preferably higher than or equal to 200° C. and lower than or equal to 500° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the CAAC-OS film in a short time. At the same time, the heat treatment in an inert atmosphere may generate oxygen vacancies in the CAAC-OS film. In such a case, the heat treatment in an oxidation atmosphere can reduce the oxygen vacancies. The heat treatment can further increase the crystallinity of the CAAC-OS film. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the CAAC-OS film in a shorter time.

As an example of the sputtering target, an In—Ga—Zn—O compound target is described below.

The In—Ga—Zn—O compound target, which is polycrystalline, is made by mixing InO$_X$ powder, GaO$_Y$ powder, and ZnO$_Z$ powder in a predetermined molar ratio, applying pressure, and performing heat treatment at a temperature higher than or equal to 1000° C. and lower than or equal to 1500° C. Note that X, Y, and Z are each a given positive number. Here, the predetermined molar ratio of InO$_X$ powder to GaO$_Y$ powder and ZnO$_Z$ powder is, for example, 1:1:1, 1:1:2, 1:3:2, 2:1:3, 2:2:1, 3:1:1, 3:1:2, 3:1:4, 4:2:3, 8:4:3, or a ratio close to these ratios. The kinds of powder and the molar ratio for mixing powder may be determined as appropriate depending on the desired sputtering target.

Alternatively, the CAAC-OS film may be formed by the following method.

First, a first oxide semiconductor film is formed to a thickness of greater than or equal to 1 nm and less than 10 nm. The first oxide semiconductor film is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that the first oxide semiconductor film becomes a first CAAC-OS film with high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the first oxide semiconductor film in a short time. At the same time, the heat treatment in an inert atmosphere may generate oxygen vacancies in the first oxide semiconductor film. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the first oxide semiconductor film in a shorter time.

The first oxide semiconductor film with a thickness of greater than or equal to 1 nm and less than 10 nm can be easily crystallized by heat treatment as compared to the case where the first oxide semiconductor film has a thickness of greater than or equal to 10 nm.

Next, a second oxide semiconductor film having the same composition as the first oxide semiconductor film is formed to a thickness of greater than or equal to 10 nm and less than or equal to 50 nm. The second oxide semiconductor film is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that solid phase growth of the second oxide semiconductor film from the first CAAC-OS film occurs, whereby the second oxide semiconductor film is turned into a second CAAC-OS film having high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the second oxide semiconductor film in a short time. At the same time, the heat treatment in an inert atmosphere may generate oxygen vacancies in the second oxide semiconductor film. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the second oxide semiconductor film in a shorter time.

In the above-described manner, a CAAC-OS film having a total thickness of 10 nm or more can be formed.

Further, the oxide semiconductor film may have a structure in which a plurality of oxide semiconductor films is stacked.

For example, a structure may be employed in which, between an oxide semiconductor film (referred to as a first layer for convenience) and a gate insulating film, a second layer which is formed using the constituent element of the first layer and whose electron affinity is lower than that of the first layer by 0.2 eV or more is provided. In this case, when an electric field is applied from a gate electrode, a channel is formed in the first layer, and a channel is not formed in the second layer. The constituent element of the first layer is the same as the constituent element of the second layer, and thus interface scattering hardly occurs at the interface between the first layer and the second layer. Accordingly, when the second layer is provided between the first layer and the gate insulating film, the field-effect mobility of the transistor can be increased.

Further, in the case where a silicon oxide film, a silicon oxynitride film, a silicon nitride oxide film, or a silicon nitride film is used as the gate insulating film, silicon contained in the gate insulating film enters the oxide semiconductor film in some cases. When the oxide semiconductor film contains silicon, reductions in crystallinity and carrier mobility of the oxide semiconductor film occur, for example. Thus, it is preferable to provide the second layer between the first layer and the gate insulating film in order to reduce the concentration of silicon in the first layer where a channel is formed. For the same reason, it is preferable to provide a third layer which is formed using the constituent element of the first layer and whose electron affinity is lower than that of the first layer by 0.2 eV or more so that the first layer is interposed between the second layer and the third layer.

Such a structure makes it possible to reduce and further prevent diffusion of impurities such as silicon to a region where a channel is formed, so that a highly reliable transistor can be obtained.

Note that in order to make the oxide semiconductor film a CAAC-OS film, the concentration of silicon contained in the oxide semiconductor film is set to lower than or equal to $2.5 \times 10^{21}/cm^3$, preferably lower than $1.4 \times 10^{21}/cm^3$, more preferably lower than $4 \times 10^{19}/cm^3$, still more preferably lower than $2.0 \times 10^{18}/cm^3$. This is because the field-effect mobility of the transistor may be reduced when the concentration of silicon contained in the oxide semiconductor film is higher than or equal to $1.4 \times 10^{21}/cm^3$, and the oxide semiconductor film may be made amorphous at the interface between the oxide semiconductor film and a film in contact with the oxide semiconductor film when the concentration of silicon contained in the oxide semiconductor film is higher than or equal to $4.0 \times 10^{19}/cm^3$. Further, when the concentration of silicon contained in the oxide semiconductor film is lower than $2.0 \times 10^{18}/cm^3$, further improvement in reliability of the transistor and a reduction in density of states (DOS) in the oxide semiconductor film can be expected. Note that the concentration of silicon in the oxide semiconductor film can be measured by secondary ion mass spectrometry (SIMS).

This embodiment can be combined with any of the other embodiments disclosed in this specification as appropriate.

Embodiment 4

In this embodiment, a program of one embodiment of the present invention will be described with reference to FIG. 8.

A program exemplified in this embodiment makes an arithmetic unit execute a process including the steps of sensing that the distance from an operating surface to an operating body in the vertical direction is less than or equal to the threshold value (th1), measuring the movement distance of the operating body in the horizontal direction and the vertical coordinate of the operating body, and outputting an image switching signal when the movement distance of the operating body in the horizontal direction in a certain period of time exceeds the threshold value (th2) and the distance from the operating surface to the operating body in the vertical direction exceeds the threshold value (th1).

With this program, not only the movement distance of the operating body in the horizontal direction but also the vertical coordinate of the operating body can be used. Consequently, a method for driving an information processing device which is adaptable to a wider variety of input methods can be provided.

FIG. 8 is a block diagram illustrating an example of a structure of an arithmetic unit 2000 which executes a program of one embodiment of the present invention.

The arithmetic unit 2000 includes a central processor 2111, a memory device 2112, and a transmission path 2114. The transmission path 2114 connects the central processor 2111, the memory device 2112, and an input/output interface 2115 to each other and transmits information.

An input/output device 2200 is connected to the transmission path 2114 via the input/output interface 2115. The input/output device 2200 is a device for inputting information to the arithmetic unit 2000 from the outside or outputting information to the outside from the arithmetic unit 2000.

As examples of the input/output device 2200, a communication device, a network connection device, and a writable external memory device such as a hard disk or a removable memory can be given.

As examples of an input device 2201, a human interface device such as a keyboard, a pointing device, or a touch panel, a camera such as a digital camera or a digital video camera, a scanner, and a read-only external memory device such as a CD-ROM or a DVD-ROM can be given.

As examples of an output device 2202, a display panel, a speaker, a printer, and the like can be given.

The program of one embodiment of the present invention can be distributed via read-only storage media into which the program has been written or via a network by download.

The central processor 2111 of the arithmetic unit 2000 reads the program of one embodiment of the present invention into the memory device 2112 from the external memory device in the input/output device 2200. Then, the central processor 2111 executes arithmetic processing in accordance with the procedure of the above program.

The arithmetic unit 2000 outputs the result of executing the program to the output device 2202 via the input/output interface 2115.

This embodiment can be combined with any of the other embodiments in this specification as appropriate.

Embodiment 5

In this embodiment, examples of an information processing device including a touch panel of one embodiment of the present invention will be described with reference to FIGS. 9A to 9F.

Figure 9A:
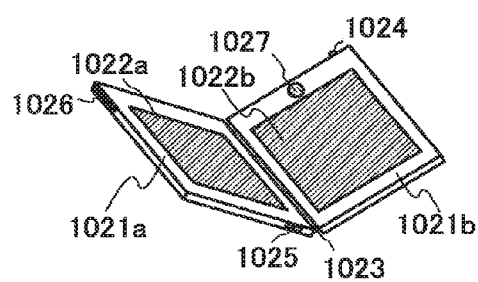
FIGS. 9A to 9F each illustrate an information processing device of one embodiment of the present invention.

An information processing device illustrated in FIG. 9A is an example of a foldable information terminal.

The information processing device in FIG. 9A includes a housing 1021a, a housing 1021b, a panel 1022a incorporated in the housing 1021a, a panel 1022b incorporated in the housing 1021b6, a hinge 1023, a button 1024, a connection terminal 1025, a storage medium insertion portion 1026, and a speaker 1027.

The housing 1021a and the housing 1021b are connected by the hinge 1023.

Since the information processing device in FIG. 9A includes the hinge 1023, it can be folded so that the panels 1022a and 1022b face each other.

The button 1024 is provided on the housing 1021b. Note that the button 1024 may be provided on the housing 1021a. For example, when the button 1024 having a function as a power button is provided, supply of power supply voltage to the information processing device can be controlled by pressing the button 1024.

The connection terminal 1025 is provided on the housing 1021a. Note that the connection terminal 1025 may be provided on the housing 1021b. Alternatively, a plurality of connection terminals 1025 may be provided on one or both of the housings 1021a and 1021b. The connection terminal 1025 is a terminal for connecting the information processing device illustrated in FIG. 9A to another device.

The storage medium insertion portion 1026 is provided on the housing 1021a. The storage medium insertion portion 1026 may be provided on the housing 1021b. Alternatively, a plurality of storage medium insertion portions 1026 may be provided on one or both of the housings 1021a and 1021b. For example, a card storage medium is inserted into the storage medium insertion portion so that data can be read to the information processing device from the card storage medium or data stored in the information processing device can be written into the card storage medium.

The speaker 1027 is provided on the housing 1021b. The speaker 1027 outputs sound. Note that the speaker 1027 may be provided on the housing 1021a.

Note that the housing 1021a or the housing 1021b may be provided with a microphone, in which case the information processing device in FIG. 9A can function as a telephone, for example.

The information processing device illustrated in FIG. 9A functions as one or more of a telephone set, an e-book reader, a personal computer, and a game machine, for example, and can be driven by the method described in any of the above embodiments.

Figure 9B:
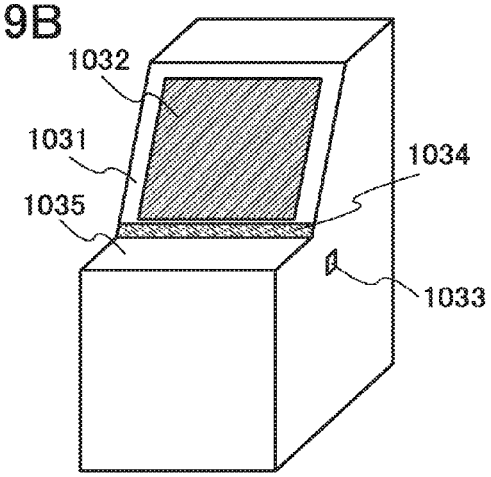

An information processing device illustrated in FIG. 9B is an example of a stationary information terminal. The information processing device in FIG. 9B includes a housing 1031, a panel 1032 incorporated in the housing 1031, a button 1033, and a speaker 1034.

Note that a panel similar to the panel 1032 may be provided on a top board 1035 of the housing 1031.

Further, the housing 1031 may be provided with a ticket slot for issuing a ticket or the like, a coin slot, a bill slot, and/or the like.

The button 1033 is provided on the housing 1031. For example, when the button 1033 is a power button, supply of power supply voltage to the information processing device can be controlled by pressing the button 1033.

The speaker 1034 is provided on the housing 1031. The speaker 1034 outputs sound.

The information processing device in FIG. 9B serves as an automated teller machine, an information communication terminal (also referred to as multimedia station) for ordering a ticket or the like, or a game machine, for example, and can be driven by the method described in any of the above embodiments.

Figure 9C:
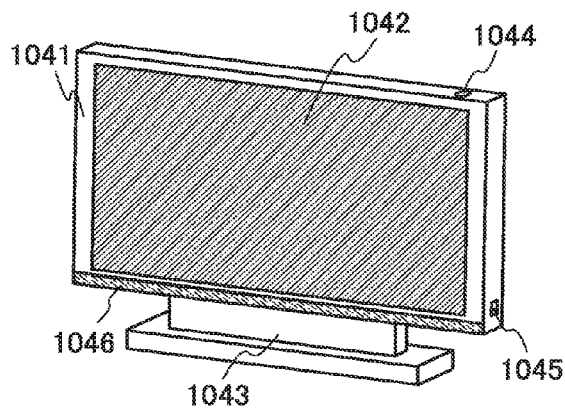

An information processing device illustrated in FIG. 9C is an example of a stationary information terminal. The information processing device in FIG. 9C includes a housing 1041, a panel 1042 incorporated in the housing 1041, a support 1043 for supporting the housing 1041, a button 1044, a connection terminal 1045, and a speaker 1046.

Note that the housing 1041 may be provided with another connection terminal for connecting the information processing device to an external device.

The button 1044 is provided on the housing 1041. For example, when the button 1044 is a power button, supply of power supply voltage to the information processing device can be controlled by pressing the button 1044.

The connection terminal 1045 is provided on the housing 1041. The connection terminal 1045 is a terminal for connecting the information processing device in FIG. 9C to another device. For example, when the information processing device in FIG. 9C and a personal computer are connected with the connection terminal 1045, the panel 1042 can display an image corresponding to a data signal input from the personal computer. For example, when the panel 1042 of the information processing device in FIG. 9C is larger than a panel of another information processing device connected thereto, a displayed image of the other information processing device can be enlarged, so that a plurality of viewers can easily see the image at the same time.

The speaker 1046 is provided on the housing 1041. The speaker 1046 outputs sound.

The information processing device in FIG. 9C functions as at least one of an output monitor, a personal computer, and a television set, for example, and can be driven by the method described in any of the above embodiments.

Figure 9D:
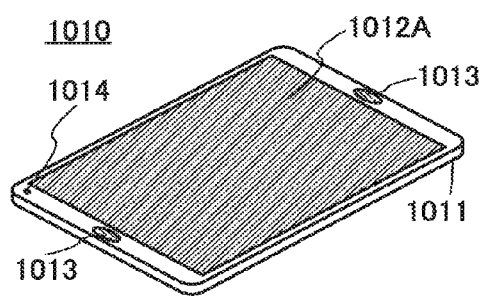
Figure 9E:
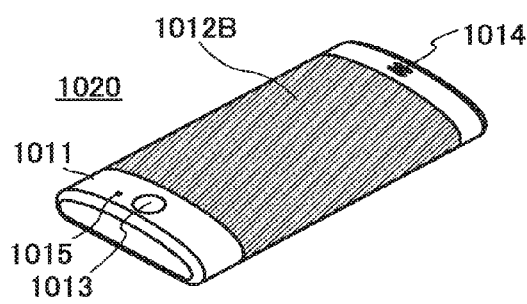

Information processing devices illustrated in FIGS. 9D and 9E are examples of portable information terminals.

A portable information terminal 1010 in FIG. 9D includes a panel 1012A incorporated in a housing 1011, an operation button 1013, and a speaker 1014. Further, although not shown, the portable information terminal 1010 includes a microphone, a stereo headphone jack, a memory card insertion slot, a camera, an external connection port such as a USB connector, and the like.

The portable information terminal 1010 in FIG. 9D can be driven by the method described in any of the above embodiments.

A portable information terminal 1020 illustrated in FIG. 9E is an example of a portable information terminal including a panel 1012B which is curved along a side surface of the housing 1011. When a substrate having a curved surface is used as a support substrate of a touch panel and a display element, a portable information terminal including a panel with a curved surface can be obtained.

The portable information terminal 1020 in FIG. 9E includes the panel 1012B incorporated in the housing 1011, the operation button 1013, the speaker 1014, and a microphone 1015. Further, although not shown, the portable information terminal 1020 includes a stereo headphone jack, a memory card insertion slot, a camera, an external connection port such as a USB connector, and the like.

The portable information terminals illustrated in FIGS. 9D and 9E each have a function of one or more of a telephone set, an e-book reader, a personal computer, and a game machine.

Figure 9F:
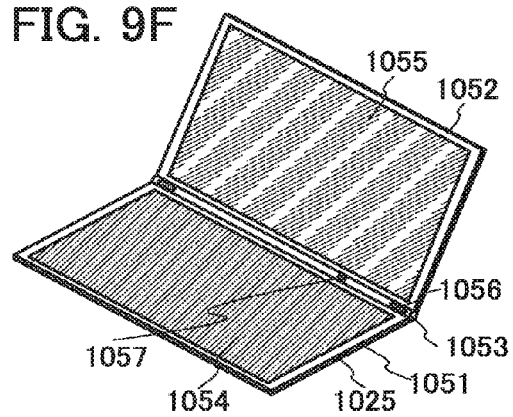

An information processing device illustrated in FIG. 9F is an example of a foldable information terminal.

The information processing device in FIG. 9F includes a housing 1051, a housing 1052, a panel 1054 incorporated in the housing 1051, a panel 1055 incorporated in the housing 1052, a speaker 1056, a startup button 1057, and a connection terminal 1025.

In the information processing device illustrated in FIG. 9F, the housing 1051 and the housing 1052 are connected to each other with a hinge 1053 and can be folded together.

The information processing device in FIG. 9F can be driven by the method described in any of the above embodiments.

For example, input keys of a keyboard or the like can be displayed on the panel 1054, and an application displayed on the panel 1055 can be operated by combination of touch operation on the input keys and input operation by a gesture toward the panel 1054.

The above is the description of the information processing devices illustrated in FIGS. 9A to 9F.

As described with reference to FIGS. 9A to 9F, the information processing device in this embodiment can be driven by the method described in any of the above embodiments. Thus, a variety of input methods can be provided and eyestrain on a user can be reduced.

This embodiment can be combined with any of the other embodiments disclosed in this specification as appropriate.

This application is based on Japanese Patent Application serial no. 2012-210228 filed with Japan Patent Office on Sep. 24, 2012, the entire contents of which are hereby incorporated by reference.

What is claimed is:

1. A method for driving an information processing device comprising a display surface displaying an image and an operating surface touched or approached by an operating body, the method comprising the steps of:
    sensing a distance from the operating surface to the operating body in a vertical direction;
    obtaining first coordinates of the operating body when a vertical coordinate among the first coordinates is less than or equal to a first threshold value;
    obtaining second coordinates of the operating body after a predetermined period of time after obtaining the first coordinates; and
    outputting an image switching signal when a vertical coordinate among the second coordinates is greater than the first threshold value, a movement distance of the operating body in a horizontal direction calculated from the first coordinates and the second coordinates is greater than a second threshold value, and an angle which is formed by a straight line connecting the first coordinates and the second coordinates projected on a horizontal-longitudinal plane and a longitudinal direction is not greater than or equal to 0° and less than 5°.

2. The method for driving the information processing device further comprising a display portion and a touch panel configured to output the image switching signal according to claim 1, the display portion including:

a pixel circuit which holds a first driving signal input and includes a display element changing, in accordance with the first driving signal, the image displayed on the display surface;

a first driver circuit outputting the first driving signal to the pixel circuit; and a second driver circuit outputting a second driving signal selecting the pixel circuit to the pixel circuit, wherein the second driver circuit has a first mode in which the second driving signal is output to the pixel circuit at a frequency of 30 times or more per second and a second mode in which the second driving signal is output to the pixel circuit at a frequency of less than 0.1 times per second, and wherein, when the image switching signal is input to the second driver circuit in the second mode, the second driver circuit is switched to the first mode and outputs the second driving signal at least once.

3. The method for driving the information processing device according to claim 2, wherein the second driver circuit is switched to the second mode again after outputting the second driving signal at least once.

4. The method for driving the information processing device according to claim 1, wherein when the vertical coordinate among the second coordinates does not exceed the first threshold value after the step of obtaining the second coordinates, the procedure returns to the sensing step without moving on to the step of outputting the image switching signal.

5. The method for driving the information processing device according to claim 1, wherein when the movement distance does not exceed the second threshold value after the step of obtaining the second coordinates, the procedure returns to the sensing step without moving on to the step of outputting the image switching signal.

6. A method for driving an information processing device comprising a display surface displaying an image and an operating surface touched or approached by an operating body, the method comprising the steps of:

sensing a distance from the operating surface to the operating body in a vertical direction;

obtaining first coordinates of the operating body when a vertical coordinate among the first coordinates is less than or equal to a first threshold value;

obtaining second coordinates of the operating body after a predetermined period of time after obtaining the first coordinates; and outputting an image switching signal when a vertical coordinate among the second coordinates is greater than the first threshold value, a movement distance of the operating body in a horizontal direction calculated from the first coordinates and the second coordinates is greater than a second threshold value, and an angle which is formed by a straight line connecting the first coordinates and the second coordinates projected on a horizontal-longitudinal plane and a longitudinal direction is not greater than or equal to 0° and less than 5°, wherein a motion of the operating body between the first coordinates and the second coordinates is recognized as a gesture of turning over a page of the image and the page is turned over when outputting the image switching signal.

7. The method for driving the information processing device further comprising a display portion and a touch panel configured to output the image switching signal according to claim 6, the display portion including:

a pixel circuit which holds a first driving signal input and includes a display element changing, in accordance with the first driving signal, the image displayed on the display surface;

a first driver circuit outputting the first driving signal to the pixel circuit; and a second driver circuit outputting a second driving signal selecting the pixel circuit to the pixel circuit, wherein the second driver circuit has a first mode in which the second driving signal is output to the pixel circuit at a frequency of 30 times or more per second and a second mode in which the second driving signal is output to the pixel circuit at a frequency of less than 0.1 times per second, and wherein, when the image switching signal is input to the second driver circuit in the second mode, the second driver circuit is switched to the first mode and outputs the second driving signal at least once.

8. The method for driving the information processing device according to claim 7, wherein the second driver circuit is switched to the second mode again after outputting the second driving signal at least once.

9. The method for driving the information processing device according to claim 6, wherein when the vertical coordinate among the second coordinates does not exceed the first threshold value after the step of obtaining the second coordinates, the procedure returns to the sensing step without moving on to the step of outputting the image switching signal.

10. The method for driving the information processing device according to claim 6, wherein when the movement distance does not exceed the second threshold value after the step of obtaining the second coordinates, the procedure returns to the sensing step without moving on to the step of outputting the image switching signal.

* * * * *